(12) United States Patent  
Dinkel et al.

(10) Patent No.: US 8,720,400 B2
(45) Date of Patent: May 13, 2014

(54) THREE-PORT PINTLE VALVE FOR CONTROL OF ACTUATION OIL

(75) Inventors: Michael J. Dinkel, Penfield, NY (US); Luis Barron, El Paso, TX (US); Jose Alberto Sanchez, Chihuahua (MX); James R. Factor, El Paso, TX (US); Miguel I. Avila, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 96 days.

(21) Appl. No.: 13/434,902

(22) Filed: Mar. 30, 2012

(65) Prior Publication Data

US 2012/0222634 A1 Sep. 6, 2012

Related U.S. Application Data

(63) Continuation-in-part of application No. 12/498,401, filed on Jul. 7, 2009, now abandoned.

(51) Int. Cl.
*F01M 1/06* (2006.01)

(52) U.S. Cl.
USPC ................... 123/90.33; 123/90.17; 123/90.16

(58) Field of Classification Search
USPC ........... 123/90.15, 90.16, 90.17, 90.31, 90.33
See application file for complete search history.

(56) References Cited

U.S. PATENT DOCUMENTS

| | | | |
|---|---|---|---|
| 4,319,607 A | 3/1982 | Fields | |
| 4,391,292 A | 7/1983 | Millar | |
| 5,950,984 A | 9/1999 | Anderson et al. | |
| 6,109,302 A | 8/2000 | Bircann | |
| 6,894,751 B2 | 5/2005 | Payne et al. | |
| 7,165,574 B2 | 1/2007 | Ryuen et al. | |

*Primary Examiner* — Zelalem Eshete
(74) *Attorney, Agent, or Firm* — Thomas N. Twomey

(57) ABSTRACT

A three-port flow control valve comprising a valve body having two opposite-facing valve seats disposed along a central bore terminating in an exhaust port. A supply port communicates with the first valve seat, and a common port communicates with the second valve seat. A pintle shaft connected to an actuating linear solenoid extends along the central bore. A first valve head actuated by the pintle shaft mates with the first valve seat. A second valve head disposed colinearly with the pintle shaft mates with the second valve seat. Opening of the first valve closes the second valve and vice versa. While the solenoid is de-energized the supply pressure keeps the first valve closed. A spring may be disposed between the second valve head and the exhaust port to urge the second valve head to close with the second valve seat.

18 Claims, 2 Drawing Sheets

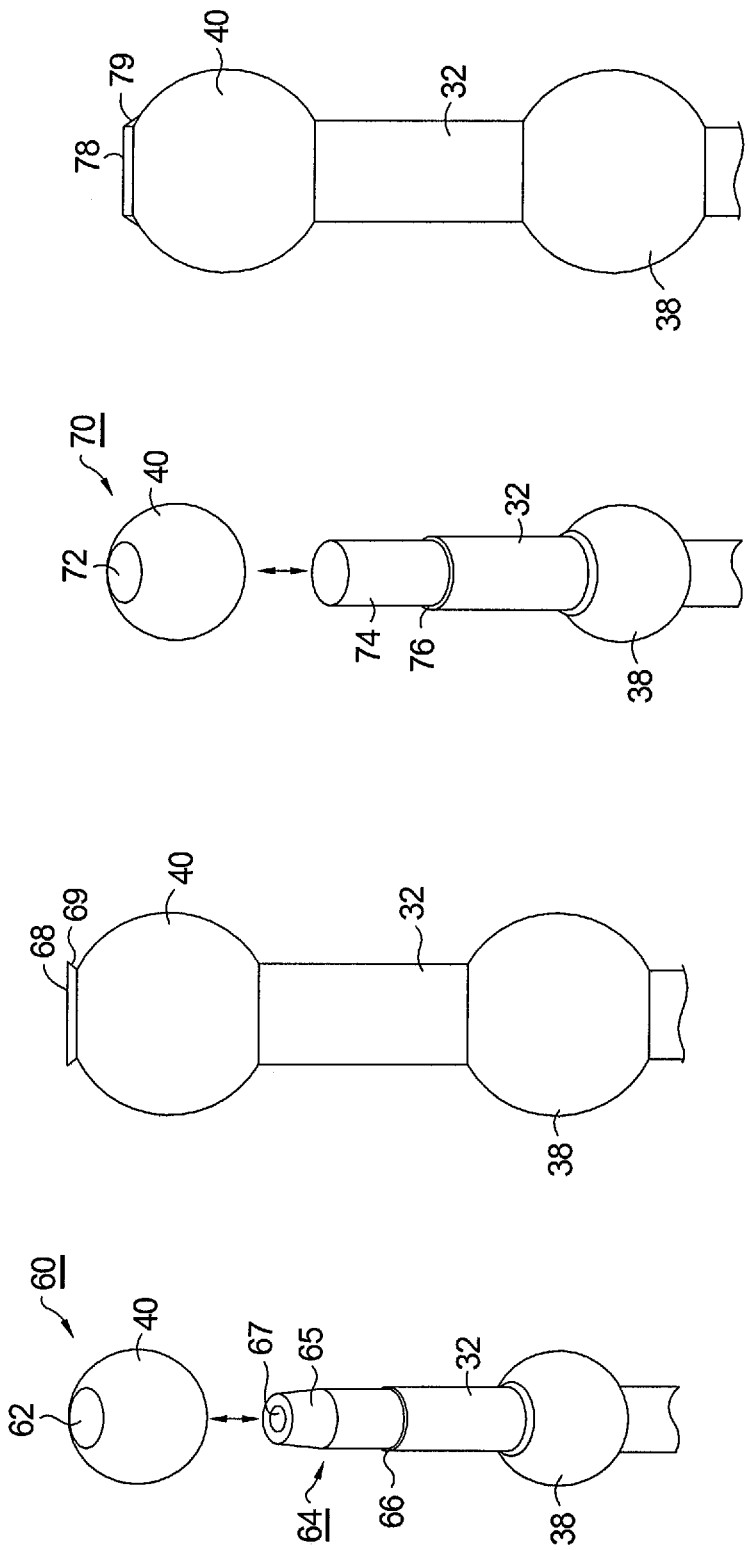

THREE-PORT PINTLE VALVE FOR CONTROL OF ACTUATION OIL

CROSS REFERENCE TO RELATED APPLICATIONS

This application is a continuation-in-part of U.S. patent application Ser. No. 12/498,401 filed on Jul. 7, 2009, the teaching of which is incorporated herein by reference in its entirety.

TECHNICAL FIELD OF INVENTION

The present invention relates to valves for directing the flow of fluids; more particularly, to a pintle-type valve for controlling fluids such as actuation oil for a hydraulically-actuated variable system such as, for example, a variable valve actuation (VVA) system in an internal combustion engine; and most particularly, to a three-port pintle valve having two valve seats and two valve heads actuated by a single pintle shaft and electrical solenoid.

BACKGROUND OF INVENTION

To increase fuel economy and/or performance in internal combustion engines, various devices and systems are known in the prior art for varying the opening and closing events of intake and exhaust valves from the eccentric rotary input of the camshaft. These devices and systems are known in the art as Variable Valve Activation (VVA) systems and require a selective supply of engine oil pressure to be provided to VVA devices, such as deactivating valve lifters (DVLs), switchable roller finger followers (SRFFs), and switchable hydraulic lash adjusters (SHLAs), as are all well known in the prior art.

Hydraulic pressure to these devices typically is provided via a solenoid-actuated three-port spool valve, having a pressurized oil supply port, a common port connected to the device, and an exhaust port for bleeding oil from the device. A spool valve typically comprises a tubular valve body containing a slidable spool connected to the solenoid that is shifted to open or close the various ports in the valve body. A significant drawback of such a spool valve is that it requires a high degree of precision in manufacture and assembly of the spool and the housing, and hence is costly to manufacture. Spool valves are also very susceptible to buildup of varnish on the spool and body walls, as well as to contamination from debris found in worn engine oil, both of which can lead to leaking and/or blowby within the valve, thus compromising performance.

What is needed in the art is an improved three-port valve that has high response, is less costly to manufacture, and is less vulnerable to varnish and contamination in use.

It is a principal object of the present invention to increase the reliability and working life of a three-port fluid control valve.

It is a further object of the invention to reduce the cost of manufacture of an internal combustion engine having VVA capability.

SUMMARY OF THE INVENTION

Briefly described, an improved three-port control valve in accordance with the invention comprises a valve body having two valve seats disposed along a central bore terminating in an exhaust port. The two valve seats face in opposite directions. A supply port is in communication with the first valve seat, and a "common" port (common to both the supply and exhaust ports) is in communication with the second valve seat. A pintle shaft connected to an actuating linear solenoid extends through an oil seal along the central bore. A first spherical valve head is actuated directly by the pintle shaft, and may be solidly mounted thereupon, and mates with the first valve seat to open and close the supply port to the common port. A second spherical head is disposed colinearly with the pintle shaft and mates with the second valve seat to open and close the common port to the exhaust port. The second spherical head may be also solidly mounted on the pintle shaft, such that opening of the first valve acts to close the second valve and vice versa, or the second spherical head may be off-spaced from the first head by a spacing rod. The second spherical head may be urged to close with the second valve seat by means of a compression spring disposed between the second spherical head and the exhaust port.

A three-port valve in accordance with the present invention is especially suited to control of VVA devices in internal combustion engines.

BRIEF DESCRIPTION OF DRAWINGS

The present invention will now be described, by way of example, with reference to the accompanying drawings, in which:

FIGS. 4 and 5 are close-up exploded isometric and elevational views, respectively, of a first means for securing a second spherical valve head to the pintle shaft in the second embodiment shown in FIG. 2; and FIGS. 6 and 7 are close-up exploded isometric and elevational views, respectively, of a second means for securing a second spherical valve head to the pintle shaft in the second embodiment shown in FIG. 2.

Corresponding reference characters indicate corresponding parts throughout the several views. The exemplifications set out herein illustrate currently-preferred embodiments of the invention, and such exemplifications are not to be construed as limiting the scope of the invention in any manner.

DETAILED DESCRIPTION OF INVENTION

Figure 1:
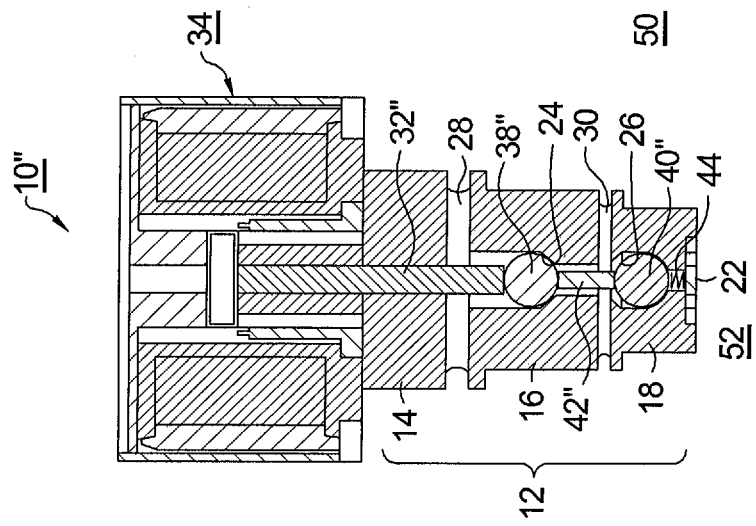
FIG. 1 is a longitudinal cross-sectional view of a first embodiment of a three-port valve in accordance with the present invention.
Figure 2:
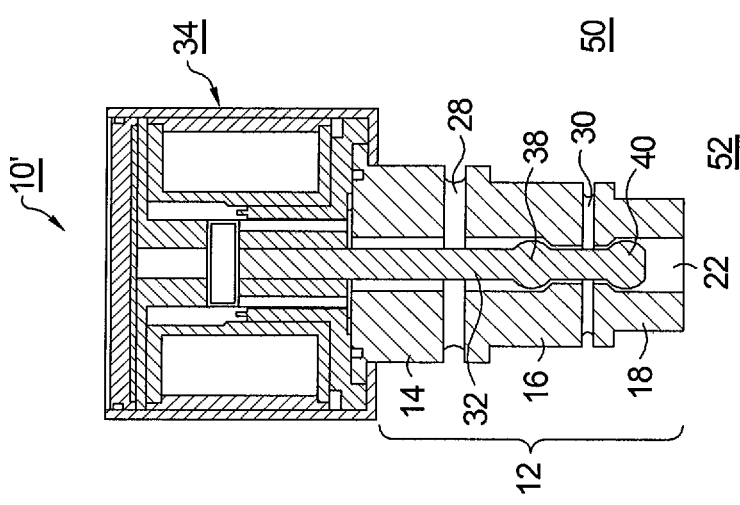
FIG. 2 is a longitudinal cross-sectional view of a second embodiment of a three-port valve in accordance with the present invention.

Referring to FIGS. 1 and 2, first and second embodiments 10,10' are shown of two improved three-port control valves in accordance with the present invention. Embodiments 10,10' comprise a valve body 12 defining first, second, and third portions 14,16,18, respectively, which may be formed as separate body sections assembled together or may comprise a single body section. A central longitudinal bore 20 extends through valve body 12 terminating in an exhaust port 22. Bore 20 is shouldered at two longitudinal locations to define first and second valve seats 24,26 (preferably conical) facing in opposite directions. A supply port 28 is in communication with first valve seat 24, and a common port 30 is in communication with second valve seat 26. A pintle shaft 32 connected to a linear solenoid actuator 34 extends through an oil seal (not shown) along bore 20. A first spherical valve head 38 is actuated directly by pintle shaft 32, and may be solidly mounted thereupon, and mates with first valve seat 24 to open and close supply port 28 to common port 30 via an intermediate diameter portion 39 of bore 20 between first and second valve seats 24,26. A second spherical valve head 40 is disposed within bore 20 colinearly with pintle shaft 32 and mates with second valve seat 26 to open and close common port 30 to exhaust port 22. Second valve head 40 may be solidly mounted on pintle shaft 32, as shown in FIG. 2, such that opening of the first valve acts to close the second valve and vice versa; or alternatively, second valve head 40 may be off-spaced from first valve head 38 by a spacing rod 42 which may be an integral extension of pintle shaft 32, as shown in FIG. 1, in which case second valve head 40 may be urged to close with second valve seat 26 by means of a compression spring 44 disposed between second valve head 40 and exhaust port 22.

Figure 3:
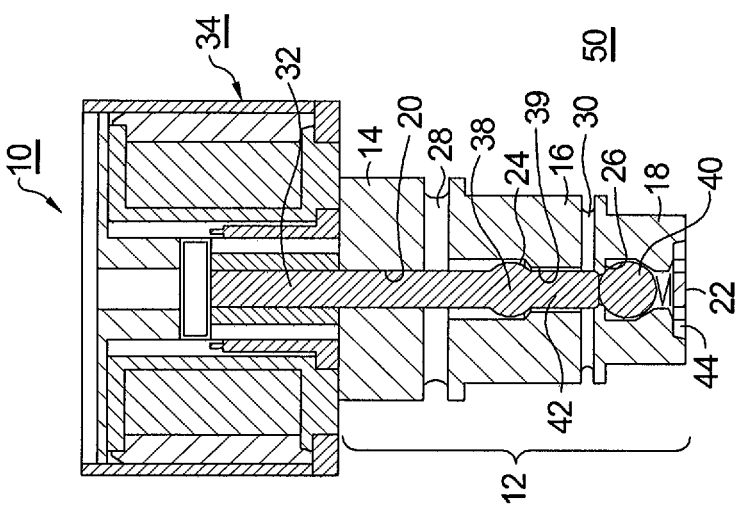
FIG. 3 is a longitudinal cross-sectional view of a third embodiment of a three-port valve in accordance with the present invention.

Referring to FIG. 3, a third embodiment 10" in accordance with the present invention comprises the same valve body 12 and portions 14,16,18, as well as the same solenoid actuator 34, as first embodiment 10. The only difference is in the construction of the pintle shaft and spherical valve heads. For ease of assembly, neither first nor second valve head 38",40" is attached to pintle shaft 32", which rather is a simple rod, the two heads being entire spheres and being separated by a spacing rod 42" of appropriate length. As in embodiment 10, second valve head 40" is urged toward second valve seat 26 by a spring 44. Note that in third embodiment 10", spring 44 must be strong enough to overcome the force exerted by oil pressure from supply port 28 when solenoid actuator 34 is retracted, but less than the combined force exerted by supply oil pressure and solenoid actuator 34 when the solenoid is actuated to close first valve seat 24.

In operation of all three embodiments, when solenoid actuator 34 is energized, pintle shaft 32,32" is urged toward solenoid actuator 34 (in the upward direction as oriented in FIGS. 1-3), causing first valve head 38,38" to be lifted from first valve seat 24, thereby opening supply port 28 to common port 30. Simultaneously, second valve head 40,40" engages second valve seat 26, thereby closing common port 30 to exhaust port 22. The reverse occurs when solenoid actuator 34 is de-energized, thus closing common port 30 to exhaust port 22 and re-opening common port 30 to supply port 28. Furthermore, when solenoid actuator 34 is de-energized, fluid pressure from supply port 28 acting on first valve head 38,38" aids in moving first valve head 38,38" into engagement with first valve seat 24 and serves to keep first valve head 38,38" engaged with first valve seat 24. In addition to fluid pressure from supply port 28 acting on first valve head 38,38" to aid in moving first valve head 38,38" into engagement with first valve seat 24 and to keep first valve head 38,38" engaged with first valve seat 24, a spring (not shown) may be provided in solenoid actuator 34 to assist in these functions.

Valves in accordance with the present invention are especially useful in directing the operation of a VVA device 50, the incorporation and action of which within the valvetrain of an internal combustion engine 52 and controlled by an engine control module are well known in the prior art and need not be elaborated upon here.

Referring now to FIGS. 4 through 7, first and second processes 60,70 are shown for attaching a second valve head 40 on the end of a pintle shaft 32 already bearing a first valve head 38, as is required in second embodiment 10'. In both processes 60,70, second valve head 40 is provided with a central bore 62,72 for receiving a reduced-diameter end 64,74 of pintle shaft 32. Second valve head 40 seats against a shoulder 66,76, the spacing of which from first valve head 38 is carefully controlled such that the first and second valves open to correct desired clearances during operation of embodiment 10'.

In process 60, end 64 may be further provided with a tapered portion 65 having a blind bore 67 rendering portion 65 hollow. After assembly of second valve head 40 onto pintle shaft 32 against shoulder 66, shaft end 68 protrudes slightly from bore 62 and may be swaged 69 in known fashion to mechanically secure second valve head 40 to pintle shaft 32.

In process 70, after assembly of second valve head 40 onto pintle shaft 32 against shoulder 76, shaft end 78 protrudes slightly from bore 72 and may be welded 79 in known fashion to fusibly secure second valve head 40 to pintle shaft 32.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

We claim:

1. A three-port fluid control valve for directing flow of pressurized fluid between a fluid supply, a user, and a fluid exhaust, comprising:
   a) a valve body having first and second valve seats disposed along a central bore terminating in an exhaust port and having a supply port formed in said valve body in communication with said first valve seat and having a common port formed in said valve body in communication with said second valve seat wherein said first and second valve seats face in opposite directions;
   b) a pintle shaft extending into said central bore;
   c) a first valve head disposed within said central bore adjacent said first valve seat and moved by said pintle shaft for mating with said first valve seat to open and close said supply port to said common port;
   d) a second valve head disposed within said central bore adjacent said second valve seat for mating with said second valve seat to open and close said common port to said exhaust port;
   e) a spacing rod disposed within said central bore between said first and second valve heads; and
   f) an actuator operatively connected to said pintle shaft.

2. A valve in accordance with claim 1 wherein said first valve head is configured to be moved and held against said first valve seat at least in part by pressurized fluid from said supply port when said actuator is de-energized.

3. A valve in accordance with claim 1 wherein said first valve head is solidly mounted upon said pintle shaft.

4. A valve in accordance with claim 1 wherein said first valve head is separate from said pintle shaft.

5. A valve in accordance with claim 4 wherein said first valve head is a sphere.

6. A valve in accordance with claim 1 wherein said second valve head is solidly mounted upon said pintle shaft.

7. A valve in accordance with claim 1 wherein said second valve head is separate from said pintle shaft.

8. A valve in accordance with claim 7 wherein said second valve head is a sphere.

9. A valve in accordance with claim 1 further comprising a spring disposed between said second valve head and said exhaust port for urging said second valve head to close against said second valve seat.

10. A valve in accordance with claim 1 wherein said spacing rod is integral with said pintle shaft.

11. A valve in accordance with claim 1 wherein said second valve head is swaged onto said pintle shaft.

12. A valve in accordance with claim 1 wherein said second valve head is welded onto said pintle shaft.

13. A valve in accordance with claim 3 wherein said second valve head is solidly mounted upon said pintle shaft.

14. A valve in accordance with claim 4 wherein said second valve head is separate from said pintle shaft.

15. A valve in accordance with claim 1 wherein said supply port is located between said actuator and said vent port.

16. A valve in accordance with claim 1 wherein said first valve head is not attached to said pintle shaft.

17. A valve in accordance with claim 16 wherein said second valve head is not attached to said pintle shaft.

18. An internal combustion engine including a variable valve actuation device, said engine comprising

- a three-port oil control valve for directing flow of pressurized oil between an engine oil supply gallery, said variable valve actuation device, and an engine oil exhaust gallery, wherein said three-port oil control valve includes
- a valve body having first and second valve seats disposed along a central bore terminating in an exhaust port connected to said engine oil exhaust gallery and having a supply port connected to said engine oil supply gallery formed in said valve body in communication with said first valve seat and having a common port connected to said variable valve actuation device formed in said valve body in communication with said second valve seat, wherein said first and second valve seats face in opposite directions,
- a pintle shaft extending into said central bore,
- a first valve head disposed within said central bore adjacent said first valve seat and moved by said pintle shaft for mating with said first valve seat to open and close said supply port to said common port,
- a second valve head disposed within said central bore adjacent said second valve seat for mating with said second valve seat to open and close said common port to said exhaust port,
- a spacing rod disposed within said central bore between said first and second valve heads, and
- an actuator directed by an engine control module and operatively connected to said pintle shaft.

* * * * *